United States Patent
Studer et al.

[15] 3,704,828
[45] Dec. 5, 1972

[54] AIRCRAFT FAN WITH OUTFLOW DEFLECTORS

[72] Inventors: Hans-Luzius Studer; Eckart Petri; Karl Wurmstedt; Jan Tomas Haas, all of Hamburg, Germany

[73] Assignee: Hamburger Flugzeubau GmbH, Hamburg, Germany

[22] Filed: Dec. 2, 1970

[21] Appl. No.: 94,296

[30] Foreign Application Priority Data

Dec. 16, 1969 Germany...............P 19 62 956.2

[52] U.S. Cl................................239/265.19, 60/230
[51] Int. Cl..................................B64c 15/06
[58] Field of Search.......239/265.19, 265.25, 265.27, 239/265.39, 265.43, 519, 516, 546; 244/12 D; 60/230

[56] References Cited

UNITED STATES PATENTS

| | | | |
|---|---|---|---|
| 3,258,206 | 6/1966 | Simonson | 239/265.27 |
| 3,581,995 | 6/1971 | Fischer | 239/265.19 |
| 3,100,377 | 9/1963 | Kosin et al | 239/265.19 |
| 2,891,740 | 6/1959 | Campbell | 244/12 D X |
| 3,087,303 | 4/1963 | Heinze et al | 239/265.25 |

FOREIGN PATENTS OR APPLICATIONS

| | | | |
|---|---|---|---|
| 1,262,596 | 4/1961 | France | 239/265.19 |

*Primary Examiner*—M. Henson Wood, Jr.
*Assistant Examiner*—John J. Love
*Attorney*—Karl F. Ross

[57] ABSTRACT

The cruise and lift fans of an aircraft are provided with an array of deflectors of the jalousie type forming a directed outflow path. The deflectors are generally of airfoil or aerodynamic profile and have flexible skins with an internal mechanism enabling the curvature to be altered to adjust the outflow direction through at least 105°.

10 Claims, 7 Drawing Figures

Hans-Luzius Studer
Eckart Petri
Karl Wurmstedt
Jan Tomas Haas
Inventors.

By Karl F. Ross
Attorney

AIRCRAFT FAN WITH OUTFLOW DEFLECTORS

FIELD OF THE INVENTION

Our present invention relates to fan-type power plants for aircraft and, more particularly, to fan arrangements for vertical takeoff and short takeoff or landing aircraft of the type having cruise or lift fans provided with outflow deflectors.

BACKGROUND OF THE INVENTION

In short takeoff and landing (STOL) and vertical takeoff and landing (VTOL) aircraft and other aircraft in which lift is provided by a downward flow of air, it has been proposed with increasing frequency, to provide cruise or lift fans which are capable of displacing large volumes of air at somewhat lower velocities than the gases emerging, for example, from a jet engine.

Such fans constitute a power plant having unique characteristics because they permit a large mass flow of air with considerable fuel economy, without the need for increasing the velocity of the gas flow to prohibitive levels. In the tip-turbine fan, for example, the power plant comprises a gas generator which may be mounted on or near the fan or remote therefrom with the connection being made by suitable hot-gas ducts. The hot gases of the generator are applied to turbine blades located along the outer periphery of the fan blade which is mounted in a large-cross-section duct to drive the fan blade in accordance with conventional gas-turbine principles. The fan in turn induces a large mass flow of air through the duct and generally propells the outflow along its axis.

Systems have been proposed in which the fans have been mounted in the fixed airfoils of the aircraft or in other portions of the body, namely, the fuselage or tail thereof. In some systems, the fans are pivotal about a horizontal axis to control the direction of the outflow and provide, selectively, lift for landing and take off, and thrust rearwardly for cruising flight. In an alternative arrangement, the fan is fixed in the aircraft, that is to say that its axis is fixedly positioned on the body, while deflector flaps are provided to direct the outflow. In this manner, fans having horizontal axes running parallel to the direction of flight may be used to provide lift while a downward deflection of the outflow or cruise thrust of the outflow is permitted to pass rearwardly relatively unimpeded by the blades or flaps.

The "flaps" have been provided heretofore as a single swingable member forming part, for example, of the afterportion of the duct, as aprons or the like in a clamshell or eye-lid closure which may be fully opened to permit the axial outflow, or as jalousie arrangements wherein, for example, an array of mutually parallel deflectors can be oriented into a relationship generally parallel to the axis of the fan or into a relationship substantially transverse thereto.

For the most part, it has been impossible with conventional systems, especially with jalousie arrays of deflectors, to obtain deflections of the outflow through angles in access of 90°. This constitutes a disadvantage when, for example, a reversal of the cruise thrust on the aircraft is desired. With a redirection of the outflow to 90°, moreover, the blades of the deflector are located generally at about 45° to the axis of the fan and undergo considerable stress. In practice it is found that a fine control of the deflection angle and other parameters of the outflow cannot be obtained.

With cruise and lift fans having tip-turbine drives for vertical or short takeoff and landing aircraft, therefore, in which it is desired to generate lift or brake thrust by directing the fan outflow steplessly through angles between 0° and 105°, the arrays of rigid concave blades hitherto employed have not been satisfactory. These blades, which are mounted in the fan duct and are swingable about the axis parallel to their longitudinal directions, lie in their ineffective position substantially parallel to the walls of the duct. They frequently may be set to an angle of 45° with respect to their normal inoperative positions, for example, but are generally incapable of providing a stepless transition of the deflection of the outflow or reversal thereof between 0° and 105°. The other deflector arrangements provide substantially higher losses in deflecting the airstream and have been found to be unsafe in many instances.

OBJECTS OF THE INVENTION

It is an object of the invention to provide an aircraft having a cruise or lift fan with airflow deflectors in which the disadvantages set forth above are obviated.

Another object of this invention is to provide an improved fan-type power plant for an aircraft which yields a sensitive continuous deflection of the outflow with a minimum of power loss.

It is another object of the invention to provide an improved deflector arrangement for the cruise or lift fans of an aircraft in which greater control of the outflow and increased deflection and even reversal thereof is possible.

SUMMARY OF THE INVENTION

These objects and others will become apparent hereinafter are obtained in accordance with the present invention, in a fan-type power plant for an aircraft which comprises, along the airflow duct of the fan, an array of deflector blades of substantially airfoil or aerodynamic profile and substantially symmetrical about respective median plans through the deflector blades, in operative position of the array, i.e. where a direct outflow of air is permitted substantially parallel to these planes. According to the principles of the present invention the blades are flexible and can be transformed into curved deflectors for directing the outflow in an off/axial manner when a concavity is imported to the blades or deflectors in the forward direction. Preferably the blades are converted, in the transition between their inoperative configuration and their air-deflecting configuration from substantially flat members into curved scoops importing a smooth deflection to the outflow. Moreover, the scoops may have elastic skins spanning rigid members to minimize the breakaway of the airflow layers along the surfaces of these scoops.

According to a more specific feature of the invention, the deflector means comprises a jalousie-type array of deflector blades extending parallel to one another across the duct of the fan and in a direction perpendicular to the axis of the latter, the array lying generally in a plane transverse to the axis of the fan. In the ineffective position of each of the blades, they lie in the respective planes of symmetry which, in turn, are generally parallel to one another and to the axis of the fan, the spaces between the blades presenting a substantial unobstructive outflow path for the mass of air displaced by the fan. When, however, the blades are deformed to form deflecting scoops, according to the present invention the tails of each blade swing into the gap between them to direct the outflow smoothly along the arc defined by the scoops.

The scoops, in a further feature of this invention, comprise rigid or heads turned toward the intake of the duct and constituting preferably 20 to 30 percent of the width (depth) of the scoop profile, i.e. the heads extend 20 to 30 percent of the distance between the tip of the head and the tip of the tail of the scoop, the head being fixedly positioned in the fan duct. The remainder of the blade or scoop thus constitutes an elastically deformable tail which can be bent continuously and steplessly to generate a deflection of the outflow or a reversal of the flow direction thereof ranging from 0° to 105°, as measured between the axis of the deflected air stream and the axis of the original or undeflected air stream. The scoops thus are capable of developing substantially any deflection within this range and have a small mass and size, while substantially precluding any undesired obstruction of the airflow in the undeformed position of the blades.

The elastically deformed scoops can, moreover, be provided with means for varying the radius of curvature of the inner and outer surfaces, i.e. the surfaces turned toward and away from the fan, so that these surfaces may change with different orientations of the blades and so that the inner surface may differ from the outer surface. Hence a highly sensitive deflection of the outflow or reversal thereof is possible and maneuvering of the aircraft facilitated in flight. In the cruise position, assuming that the deflector means are used upon a cruise fan and the planes of symmetry of the blades lie horizontally, the scoops assume their symmetrical profile and offer little resistance to the outflow.

Moreover, we have found it to be advantageous to provide either the underside or the upper side of the scoop, or both, with skins or cover plates which taper or converge in the outflow direction, thereby facilitating the generation of the desired radius of curvature upon displacement of the scoop into the deflection position. The scoop may be provided with a stack of leaf springs, e.g. formed by a multiplicity of this plates, within its interior to resiliently resist the displacement of the scoop into the deflecting position and/or for maintaining the desired conformation of the upper surface of the deflector. In one embodiment of the invention, a swinging lever can be provided within the deflector, i.e. between the upper and lower skins thereof and can be formed with an inwardly concave contour member for imparting the desired conformation to the inner skin of the deflector. The lever may form part of a linkage serving simultaneously to displace the tail of the deflector along a predetermined path to develop the desired deflection of the outflow.

In another important feature of the invention, each deflector blade is provided with an actuating mechanism (which may be common to all of the blades of the respective array) for swinging the tail of the deflector relative to the fixed head portion mentioned earlier. When reference is made to a head portion fixedly positioned with respect to the body of the aircraft or the fan duct, however, it should be understood that it is intended to so designate a member which suffers little or no translation from its given position with respect to the duct but which may be angularly displaceable about an axis at or in the region of this location. Hence the means for changing the tail of the deflector blade may define the radius of curvature of the inner surface in conjuction with contouring members, stacks of springs and, of course, the inherent elasticity or resiliency of the respective skins.

According to still another feature of this invention, the elastic skins of the aerodynamically shaped blades are supported by rigid members running the length of the blades and defining ribs or the like. Therefore, upon deflection of the flexible skins by, for example, movement of the tail of the blade relative to its head, the blade is deformed and a predetermined internal spacing of the skin is maintained as one or both skins bend and/or vary in length to generate the bent contour as defined by the stiffening ribs. For example, the upper skin of the latter blade may be formed from overlapping elastic sheet metal strips between which gas may be forced to reduce the tendency of the streamlines along the upper surface of the blade to break away from therefrom.

Where the fans are used as both cruise fans and lift fans, in accordance with the present invention, optimum operation of the power plant generally requires a reduced velocity of the outflow for lift purposes and a greater velocity for cruise purposes, the throughput being substantially the same. To this end, we have found it to be advantageous, in accordance with another feature with the invention, to orient the upper blades with a positive angle and the lower blades with the negative angle, thereby forming a nozzle-shaped passage through which the air outflow is accelerated. The "upper blades" may be thus disposed in the upper half of the duct when the letter runs horizontally as is the case where the fan lies in a substantially vertical plane. Similarly, the "lower fans" are those disposed in the lower half of the duct.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
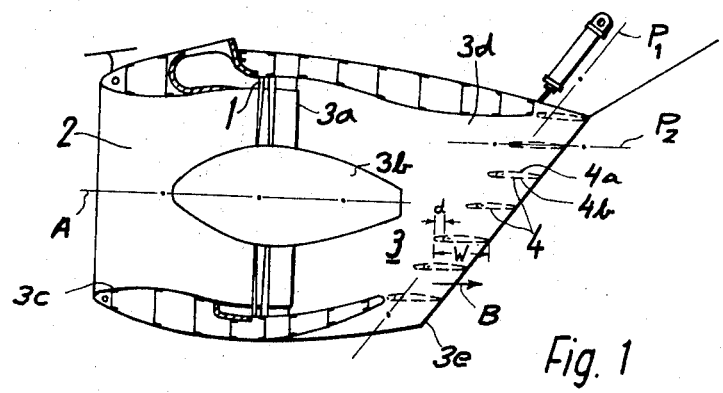
FIG. 1 is a diagrammatic axial-cross sectional view through a tip-turbine fan according to the present invention with the deflectors thereof arranged for horizontal or cruise flight.
Figure 2:
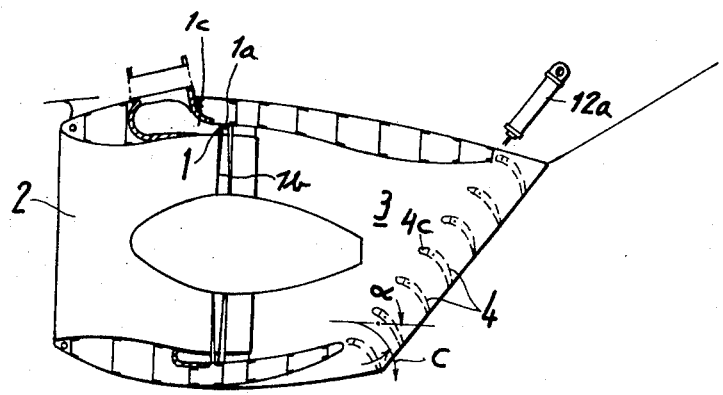
FIG. 2 is a diagrammatic axial cross-sectional view of the fan-type aircraft power plant of FIG. 1 showing the positions of the deflectors for deviation of the outflow through an angle of 90° or greater.

In FIGS. 1 and 2, we have shown an aircraft power plant adapted to be suspended from or mounted upon the fixed airfoil of an aircraft and comprising a tip-turbine fan 1, the outer portion of which constitutes a ring of turbine blades 1a while the inner portion 1b constitutes blades for the gas displacement of air through a duct 3 of the cruise and lift fan which is generally designated at 2.

Along the outer periphery of the fan 1, there is provided a gas-distribution chamber or scroll 1c through which hot gases from a gas generator are delivered to the turbine blades. The turbine blades thus receive a torque which is transmitted by direct coupling to the fan blades which are for direct rotation about the longitudinal axis A of the fan. Further blades or a spider 3a may be provided to support a streamlined central body 3b serving to guide the throughput of the fan. Ahead of the fan blades 1b, the duct 3 is formed with a mouth 3c through which an influx of air can be induced, the outflow traversing the duct portion behind the fan represented generally at 3d. At the end of the duct, an outlet 3e is formed.

The gas generator may, of course, be mounted individual to the fan 2, i.e. in the same nozzle or on the same pylon and may communicate directly therewith through an opening in a common housing wall. A gas generator individual to the fan may also be provided with some spacing therefrom and connected to the fan by hot-gas, gas ducts, or else gas generators serving a number of fans may be provided, suitable duct means connecting the fans in any desired associated and, if necessary, permitting equalizing flow of gas between ducts of inoperative generators and those of operative generators.

It should be understood that, while we have described the fans of FIGS. 1 and 2 as a cruise and lift fan and have suggested that it will generally be mounted upon a fixed airfoil of theaircraft, such fans may also be mounted elsewhere on the body, e.g. on the fuselage and tail. Furthermore, the invention is not to be considered as limited to cruise and lift fans, since the principles are applicable wherever redirection of an outflow of an aircraft fan is desired and the principles may be used on trim-control fans and the like wherever the deflection of air is considered necessary.

From FIGS. 1 and 2 it may also be seen that the deflectors are blades which are generally represented at 4 and lie in an array in a plane $P_1$ which is traverse to the axis A. In the inoperative position of the blades 4, they lie substantially horizontally, i.e. generally parallel to the horizontal planes $P_2$ which are parallel to one another, parallel to the axis A and transverse to the plane $P_1$. Furthermore, the flexible skins 4a and 4b on the upper and lower sides of the blades 4 assume symmetrical curvatures about the median plane which here is also the plane $P_2$. With the blades 4 in the position illustrated in FIG. i the outflow gases pass between the blades substantially without impediment and within the direction of axis A as represented by the arrows B.

Figure 4:
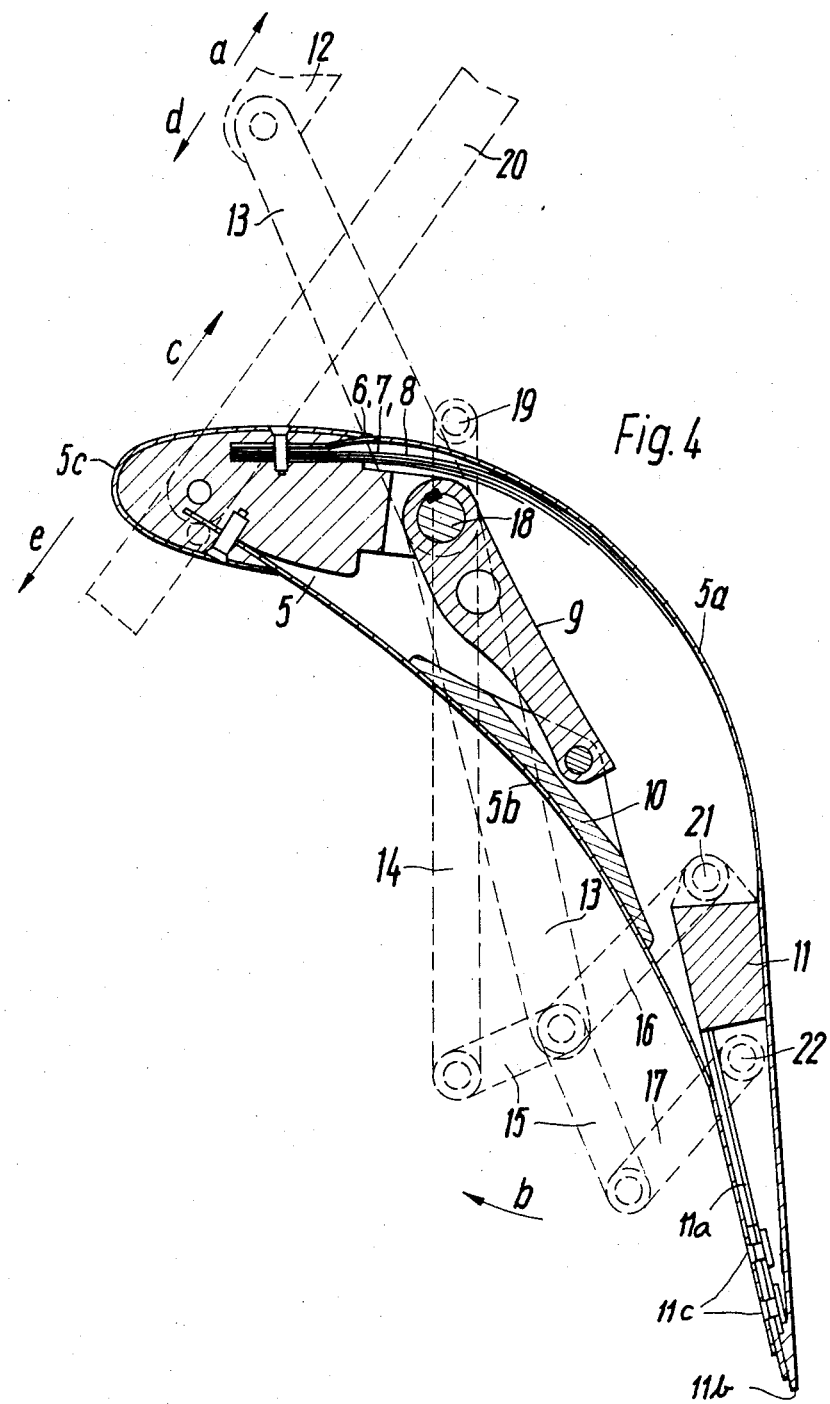
FIG. 4 is a similar section showing the blade deflected into its scoop configuration.

When the blades 4 are actuated, they are displaced to form scoops as shown in FIG. 4, thereby deflecting the air downwardly as represented by arrow C. The angle of deflection $\alpha$ of the air stream from its normal direction may be between 0° and 105° as mentioned earlier. In bending the scoops 4, the lower surface 4b is constituted a forwardly concave inner surface while the upper surface 4a is constituted a rearwardly convex outer surface. From FIGS. 1 and 2 it will also be apparent that the blades each have a fixed portion at the front end of the blade, i.e. a portion which is not translated with respect to the axis A, while the tail of each blade may be swung downwardly (compare FIGS. 1 and 2) to impart the deflecting curvature to the scoops. Also, the fixedly positioned forward portion 4c extends to a distance d which may make up 20 to 30 percent of the depth or width w of the blade. The underside of the scoop and/or the upper side thereof can comprise wedge-shaped or tapering sheets which narrow toward the trailing end of the scoop. When the term "trailing end" is used in this sense, applicants intend to designate that portion of the scoop which trails in the direction of normal cruising flight.

Figure 3:
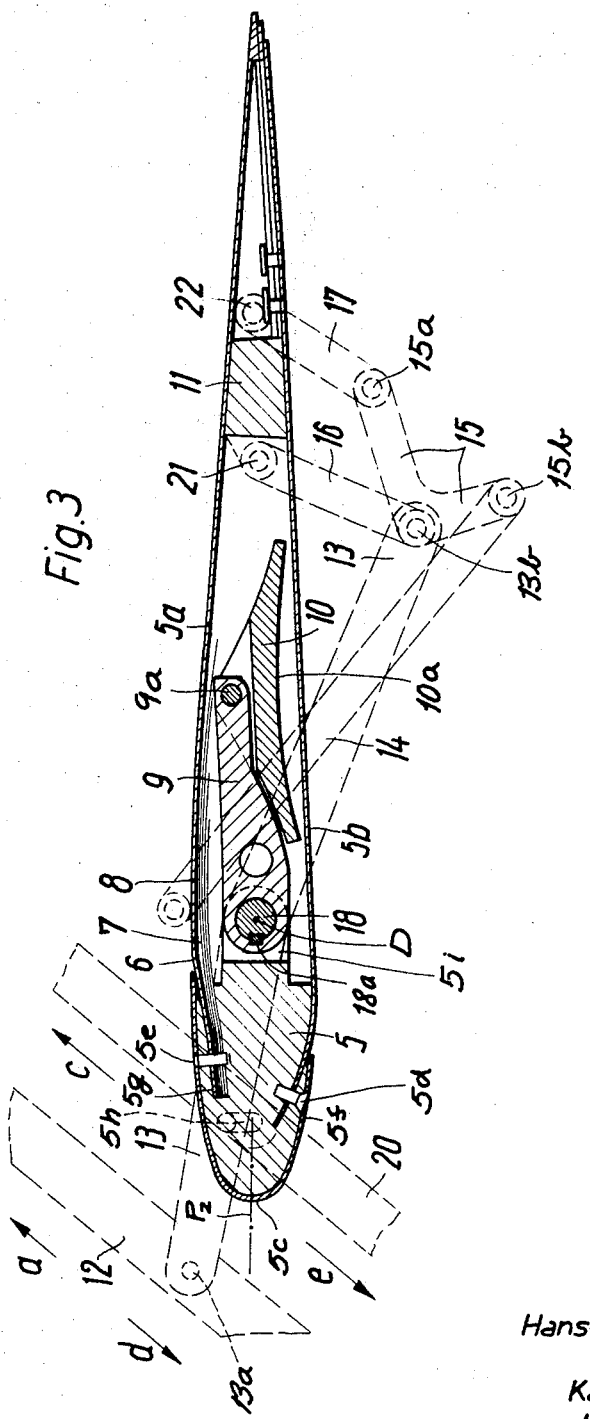
FIG. 3 is a vertical longitudinal section, drawn to an enlarged scale of one of the deflector blades of the system of the FIGS. 1 and 2.

In FIGS. 3 and 4, the construction of the blades is shown in somewhat greater detail according to one embodiment of the invention. Note in FIG. 3, for example, that the median plane $P_2$ through the straightened blade is also a plane of symmetry with respect to the upper and lower flexible skins.

The flexible blades illustrated in FIGS. 3 and 4, according to the present invention, comprise an upper flexible skin 5a and a lower skin 5b connected with a rigid head 5c by rivets or screws 5d and 5e. The rigid head 5c is further formed with a skin 5f which may be similarly secured in place. Along the upper side of the blade 5, we provide a stack of spring blades 6, 7 and 8 which are fixed in a slot 5g in the head 5 and bear upon the upper skin 5a outwardly when the blade 5 is bent into scoop shape as previously indicated. The head 5 is fixedly positioned in the fan duct against translation but is pivotally tied at 5h to a rod or bar 20 as will be apparent hereinafter. For angular movement about the axis D of a lug 5i through which a shaft 18 extends, the shaft 18 is keyed at 18a to a swinging lever 9 articulated at its free end 9a to a configuration piece 10 facing downwardly and having a convex curvature 10a corresponding to the optimum curvature to the lower and inner skin 5b when the blade is bent. The conformation piece 10 is designed to impart to the inner surface of the lower skin 5b the desired curvature of the scoop or blade (see FIG. 4).

At the trailing end of the blade 5, we may provide a further rigid member 11 tapered rearwardly and serving to support the flexible skins. The rigid member 11, moreover, may have a pair of blades 11a extending rearwardly to the rib 11b of the tail of the scoop and riveted at 11c to the lower skin 5b, the rivets 11c being slidable along slots in the blades 11a to permit extension of the underside of the scoop. The system for shifting the tail of the deflector to produce the scoop-shaped configuration is represented by a lever system 13 – 17.

Figure 7:
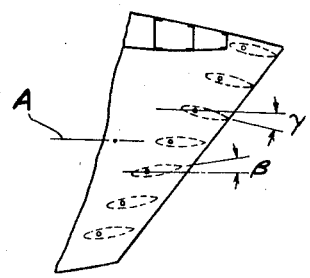
FIG. 7 is a view similar to FIG. 1 but illustrating another modification.

In cruise flight, the blade 5 may lie, as shown in FIG. 3, in a generally planar position parallel to the axis A (FIG. 1) or inclined to the horizontal plane of this axis with a positive angle $\gamma$ (FIG. 7) or a negative angle $\beta$ to acellerate or increase the velocity of the outflow or cruise flight as previously described. In this case, all of the blades 5 in the upper half of the duct 3 receive a positive angle while all of the blades of the lower half of the duct receive the negative angle as illustrated. For deflection of the outflow, or reversal of the outflow direction, the pull rod 12 is displaced by, for example, the hydraulic cylinder 12a in the direction of arrow a to swing the double arm lever 13 in the clockwise sense (FIGS. 3 and 4) about the axis D, the lever 13 being articulated at 13a to the bar 12. The shaft 18 is fixed to the lever 13 and is rotated similarly, to swing the lever 9 in the clockwise sense and bring the conformation piece 10 against the inner side of the skin 5b. The desired curvature is, consequently, imparted to the inner surface of the scoop or blade as it is formed.

The other end of the lever 13 is articulated at 13b to the fulcrum of a bellcrank lever 15 and to the link 16 which, in turn, may swing with respect to the lever 15. Since one end 15a of the bellcrank lever 15 is articulated to a further link 17 and the links 16 and 17 are hingedly connected at 21 and 22 with the rigid member 11, the tail of the blade is swung downwardly and inwardly as will be apparent from FIG. 4.

The other end of the bellcrank lever 15 is articulated to a pull-push bar 14 at 15b, the bar 14 being imparting a swinging movement in the direction of arrow b whereby the desired position of the tail of the blade can be established. To adjust the nose or head 5c of the blade, a further pushrod 20 is provided which, when shifted in the direction of arrow c, swings the head about the pivot D. Similar piston arrangements with the appropriate servomechanisms can be used for all of the actuators 12, 14, 20.

For a deflection of the outflow between 0° and 105°, for example, the actuators 12 and 20 are operated to curve the deflector as shown. Further movement of the bellcrank lever 15 in the clockwise sense will, of course, provide reversal of the direction of flow of the air for braking purposes or the like. Upon release of the actuators or their movement in the direction of arrows d and e, the levers and links swing back into their original positions (FIG. 3) while the skins 5a and 5b assume their symmetrical orientations with respect to a median plane through the device. The pivots 21 and 22 are guided in slots in the wall of the duct 3.

Figure 5:
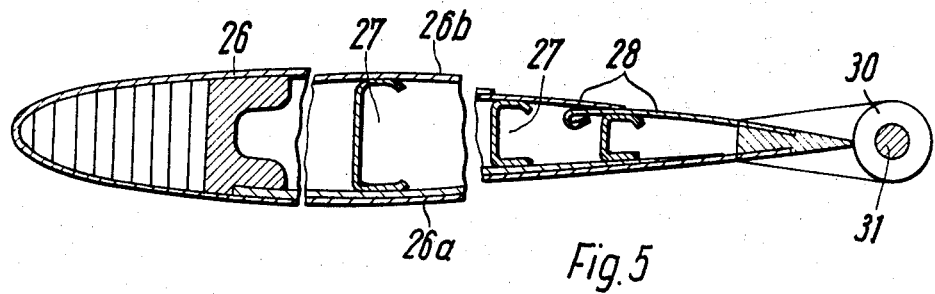
FIG. 5 is a vertical longitudinal section through another embodiment of the flexible deflector scoop.
Figure 6:
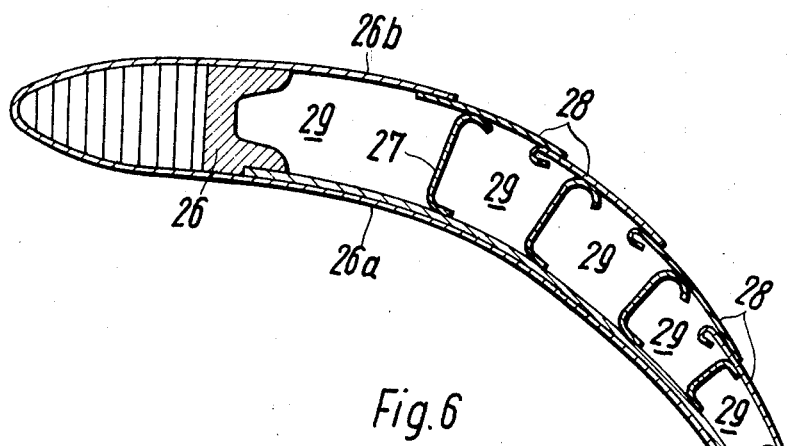
FIG. 6 is a section similar to FIG. 5 but showing the blade in its operative position.

In the embodiment illustrated in FIGS. 5 and 6, the blade 26 is provided with a flexible skin 26a along its underside and a skin 26b made up of overlapping blades 28, the inner edges of which are curled to facilitate the passage of gas through the slots between the blades. The cross section is maintained by U-profile ribs 27 which are movably fixed to the blades, e.g. by rivets sliding in slots or the like. The overlapping strips 28, of course, are composed of sheet metal.

The skin 26a along the underside of the blade is convergent in the direction of the tail thereof, i.e. is wedge-shaped and tapered in the direction of the actuating member 31. At the tail of the blade, we provide a bearing arrangement 30 which receives a pin 31, the latter being movable relative to the head as shown by comparison of FIGS. 5 and 6. In the normal cruise position, the blade assumes the configuration illustrated in FIG. 5 in which it is symmetrical about a horizontal median plane therethrough. When the curvature of FIG. 6 is imparted to the blade, the upper skin is extended and the blades 28 slide relative to one another. In the chambers 29 between the ribs 27, compressed air or other pressurized gas is introduced to limit the tendency of the stream flowing along the upper surface of the blade to break away.

I claim:

1. In a fan-type power plant for an aircraft, in combination:

means forming an air-flow duct having an inlet and an outlet;

a fan mounted in said duct between said inlet and said outlet for inducing a flow of air providing thrust for the aircraft through said duct and discharging same in an outflow through said outlet;

an array of substantially mutually parallel deflector blades extending across said outlet, each of said blades having a first conformation wherein said blades extend generally in the direction of the outflow and are of an aerodynamic profile substantially symmetrical about a median plane therethrough, and a second conformation wherein the blade is curved to deflect said outflow, said blades being elastically deformable between said conformations, each of said blades being formed with:

a head translationally fixed in said duct and disposed at an end of the blade facing said fan in said first conformation, a trailing end remote from said blade and shiftable in said duct, said head extending over substantially 20 to 30 percent of the length of the blade between said ends, a flexible upper side, and a flexible lower side, at least one of said sides being composed of sheet metal of a thickness tapering in the direction of said trailing end; and means for bending said blades to alter the conformation thereof.

2. The combination defined in claim 1 wherein, the blades in the upper portion of said duct are oriented with a positive angle with respect to the axis of said fan and the blades of a lower portion of said duct are oriented with a negative angle relative to said axis in the first conformation of the blades to increase the velocity of the outflow traversing said array of blades.

3. In a fan-type power plant for an aircraft, in combination;

means forming an air-flow duct having an inlet and an outlet;

a fan mounted in said duct between said inlet and said outlet for inducing a flow of air providing thrust for the aircraft through said duct and discharging same in an outflow through said outlet;

an array of substantially mutually parallel deflector blades extending across said outlet, each of said blades having a first conformation wherein said blades extend generally in the direction of the outflow and are of an aerodynamic profile substantially symmetrical about a median plane therethrough, and a second conformation wherein the blade is curved to deflect said outflow, said blades being elastically deformable between said conformation, each of said blades having:

a head facing in the direction of said fan at one end of the blade in said first conformation, a trailing end remote from said blade, and a flexible skin between said ends forming upper and lower sides of the blade, said sides being mutually symmetrical about the respective median plane in said first conformation and said lower side being concave while said upper side is convex in said second conformation; and means for bending said blades to alter the conformation thereof.

4. The combination defined in claim 3, further comprising a respective rigid conformation piece movably received in each of said blades and having a concave curvature facing the inner surface of said lower side, and means for shifting said conformation pieces into engagement with the said inner surfaces of said blades to define the curvatures of said lower sides in the second conformation of said blades.

5. The combination defined in claim 4 wherein the means for bending said blades includes a lever arrangement actuatable by at least one pull-and-push rod articulated to said trailing end, said conformation piece and said head of each of said blades.

6. The combination defined in claim 3, further comprising a respective stack of leaf springs mounted in each of said blades and resiliently bearing upon the inner surface of said upper side for maintaining the convex curvature thereof upon bending of said blades from said first conformation to said second conformation.

7. The combination defined in claim 3, further comprising a respective set of channel-shaped ribs received in each of said blades and engaging the inner surfaces of said sides for maintaining a spacing therebetween, the skin of said upper side being formed by an array of overlapping mutually slidable elastic sheet-metal strips.

8. The combination defined in claim 7, further comprising means for introducing a pressurized gas into said blades between said ribs for discharge between said strips to restrict the breakaway of air stream along the upper side of each blade.

9. The combination defined in claim 13 wherein the blades in the upper portion of said duct are oriented with a positive angle with respect to the axis of said fan and the blades of a lower portion of said duct are oriented with a negative angle relative to said axis in the first conformation of the blades to increase the velocity of the outflow traversing said array of blades.

10. In a fan-type power plant for an aircraft, in combination means including a closed wall forming an airflow duct having an inlet at one end and an outlet at an opposite end of said duct; a tip-turbine driven fan mounted in said duct between said inlet and said outlet for inducing a flow of air through said duct from said inlet and discharging same in an outflow through said outlet; means for directing hot combustion gases at the periphery of said fan for driving same; an array of substantially mutually parallel deflector blades extending across said outlet, each of said blades having a head turned toward said fan and a tail turned away from said fan and being formed with substantially continuous surfaces extending from its head to its tail, the blades each being elastically deformable to deflect its tail relative to its head and in part smoothly-curved contours to said surfaces; and control means connected with said blades for bending same elastically to alter the conformations thereof.

* * * * *